US010393413B2

(12) United States Patent
Suzuki et al.

(10) Patent No.: US 10,393,413 B2
(45) Date of Patent: Aug. 27, 2019

(54) HEAT PUMP APPARATUS WITH REFRIGERANT LEAKAGE PROTECTION

(71) Applicant: Mitsubishi Electric Corporation, Tokyo (JP)

(72) Inventors: Yasuhiro Suzuki, Tokyo (JP); Yoshihiro Takahashi, Tokyo (JP); Takao Komai, Tokyo (JP); Akira Maeda, Tokyo (JP); Mitsuru Kawashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 303 days.

(21) Appl. No.: 15/329,657

(22) PCT Filed: Aug. 4, 2015

(86) PCT No.: PCT/JP2015/072100
§ 371 (c)(1),
(2) Date: Jan. 27, 2017

(87) PCT Pub. No.: WO2016/047278
PCT Pub. Date: Mar. 31, 2016

(65) Prior Publication Data
US 2017/0227262 A1 Aug. 10, 2017

(30) Foreign Application Priority Data

Sep. 25, 2014 (JP) ................................ 2014-195103

(51) Int. Cl.
*F25B 13/00* (2006.01)
*F24F 11/74* (2018.01)
(Continued)

(52) U.S. Cl.
CPC .......... *F25B 13/00* (2013.01); *F24D 11/0214* (2013.01); *F24D 17/0078* (2013.01);
(Continued)

(58) Field of Classification Search
CPC .......... F24F 1/0007; F24F 3/001; F24F 11/36; F24F 2001/004; F24F 2001/0048; F25B 2500/22; F25B 2500/222
See application file for complete search history.

(56) References Cited

U.S. PATENT DOCUMENTS 6,536,225 B1 * 3/2003 Yajima ...................... F24F 1/02
62/407
2013/0192283 A1 * 8/2013 Yamashita ................ F24F 1/32
62/126

FOREIGN PATENT DOCUMENTS

JP      2000-249435 A    9/2000
JP      2008-051370 A    3/2008
(Continued)

OTHER PUBLICATIONS

WO 00/52394 (English Translation).*
(Continued)

*Primary Examiner* — Jonathan Bradford
(74) *Attorney, Agent, or Firm* — Posz Law Group, PLC (57) ABSTRACT

A load unit includes a water circuit chamber configured to accommodate at least a part of a water circuit configured to allow water to flow therethrough, a fan, an air inlet formed at a height positioned different from that of the air inlet and configured to suck indoor air therethrough, an air outlet configured to blow indoors the air sucked through the air inlet, and an air passage formed between the air inlet and the air outlet so as to be isolated from the water circuit chamber. A load-side heat exchanger is provided in the air passage.

16 Claims, 7 Drawing Sheets

(51) Int. Cl.
  *F24F 11/89*    (2018.01)
  *F25B 1/00*     (2006.01)
  *F25B 49/02*    (2006.01)
  *F24D 11/02*    (2006.01)
  *F24D 17/00*    (2006.01)
  *F24D 17/02*    (2006.01)
  *F24F 3/00*     (2006.01)
  *F24F 11/77*    (2018.01)
  *F24F 11/36*    (2018.01)
  *F24F 1/005*    (2019.01)
  *F24F 1/0057*   (2019.01)

(52) U.S. Cl.
  CPC .............. *F24D 17/02* (2013.01); *F24F 1/005* (2019.02); *F24F 1/0057* (2019.02); *F24F 3/001* (2013.01); *F24F 11/36* (2018.01); *F24F 11/74* (2018.01); *F24F 11/77* (2018.01); *F24F 11/89* (2018.01); *F25B 1/00* (2013.01); *F25B 49/02* (2013.01); *F24F 2221/17* (2013.01); *F24F 2221/183* (2013.01); *F25B 2313/0293* (2013.01); *F25B 2400/12* (2013.01); *F25B 2500/222* (2013.01)

(56) References Cited

FOREIGN PATENT DOCUMENTS

| | | |
|---|---|---|
| JP | 2010-092135 A | 4/2010 |
| JP | 2013-047591 A | 3/2013 |
| WO | WO-0052394 A1 * | 9/2000 ................ F24F 1/02 |
| WO | 2011/099065 A1 | 8/2011 |
| WO | 2012/073293 A1 | 6/2012 |

OTHER PUBLICATIONS

Chinese office action corresponding to Chinese Patent Application No. 201510616064.9 dated Apr. 3, 2018 with English translation.
Office Action dated Nov. 6, 2017 issued in corresponding CN patent application No. 201510616064.9 (and English translation).
International Search Report of the International Searching Authority dated Oct. 20, 2015 for the corresponding International application No. PCT/JP2015/072100 (and English translation).
Office Action dated Jul. 26, 2016 issued in corresponding JP patent application No. 2014-195103 (and English translation).

* cited by examiner

HEAT PUMP APPARATUS WITH REFRIGERANT LEAKAGE PROTECTION

CROSS REFERENCE TO RELATED APPLICATIONS

This application is a U.S. national stage application of PCT/JP2015/072100 filed on Aug. 4, 2015, which claims priority to Japanese Patent Application No. 2014-195103 filed on Sep. 25, 2014, the contents of which are incorporated herein by reference.

TECHNICAL FIELD

The present invention relates to a heat pump apparatus.

BACKGROUND ART

Hitherto, a nonflammable HFC refrigerant such as R410A is used in heat pump apparatuses. Unlike a related-art HCFC refrigerant such as R22, R410A has an ozone depletion potential (hereinafter referred to as "ODP") of zero and hence does not deplete the ozone layer. However, R410A has a characteristic of high global warming potential (hereinafter referred to as "GWP"). Therefore, as part of prevention of global warming, consideration is made to replace the HFC refrigerant having high GWP, such as R410A, with refrigerant having low GWP.

As a candidate for such refrigerant having low GWP, there are given HC refrigerants, such as R290 ($C_3H_8$; propane) and R1270 ($C_3H_6$; propylene), which are natural refrigerants. However, unlike nonflammable R410A, R290 and R1270 have flammability at a high flammability level (high flammability). Therefore, when R290 or R1270 is used as refrigerant, caution needs to be paid for refrigerant leakage.

Further, as another candidate for the refrigerant having low GWP, there is given an HFC refrigerant having no carbon-carbon double bond in a composition thereof, e.g., R32 ($CH_2F_2$; difluoromethane) having GWP lower than R410A.

Further, as a similar refrigerant candidate, there is given halogenated hydrocarbon having a carbon-carbon double bond in a composition thereof, which is a kind of the HFC refrigerant similarly to R32. As such halogenated hydrocarbon, there are given, for example, HFO-1234yf ($CF_3CF=CH_2$; tetrafluoropropene) and HFO-1234ze ($CF_3-CH=CHF$). In order to distinguish the HFC refrigerant having a carbon-carbon double bond in a composition thereof from the HFC refrigerant having no carbon-carbon double bond in a composition thereof such as R32, the HFC refrigerant having a carbon-carbon double bond in a composition thereof is often expressed as "HFO" with "O" for olefin (unsaturated hydrocarbon having a carbon-carbon double bond is called olefin).

The above-mentioned HFC refrigerant (including the HFO refrigerant) having low GWP is not as highly flammable as the HC refrigerant such as R290, which is a natural refrigerant. However, such HFC refrigerant has flammability at a low flammability level (low flammability) unlike nonflammable R410A. Therefore, similarly to R290, caution needs to be paid for refrigerant leakage. Refrigerant having flammability at a slightly flammable level or higher (for example, 2L or higher under the ASHRAE 34 classification) is hereinafter referred to as "flammable refrigerant".

BACKGROUND ART

When the flammable refrigerant leaks indoors, there is a fear in that an indoor refrigerant concentration increases to cause formation of a flammable concentration region.

In Patent Literature 1, there is described an air conditioning apparatus including an outdoor unit, a heat medium relay unit, and an indoor unit. In the air conditioning apparatus, the heat medium relay unit is installed in a space such as a space above a ceiling, which is inside a building but different from an indoor space. A relay unit fan for ventilation inside a casing is provided in the heat medium relay unit. Further, an opening port is formed in the casing of the heat medium relay unit at a position from which air from the relay unit fan escapes. The relay unit fan is driven, for example, all the time (including a period of time of stopping an operation of the air conditioning apparatus) with the airflow rate equal to or higher than the ventilation air flow rate to suppress the refrigerant concentration inside the casing of the heat medium relay unit to be lower than a lower limit flammable concentration.

CITATION LIST

Patent Literature

Patent Literature 1: WO 2012/073293 A1

SUMMARY OF INVENTION

Technical Problem

In the air conditioning apparatus described in Patent Literature 1, however, no definition is provided as to a positional relationship among the relay unit fan, an intermediate heat exchanger, and the opening port inside the casing of the heat medium relay unit, and as to the opening port and a configuration of an air passage. Therefore, there is a problem in that the refrigerant leaking inside the casing of the heat medium relay unit cannot be effectively discharged from the casing, with the result that the leaking refrigerant may stagnate inside the casing. Further, the leaking refrigerant discharged from the casing of the heat medium relay unit is not necessarily diffused in an effective manner in the space inside the building in which the heat medium relay device is installed, or indoors. Therefore, there is a problem in that an indoor refrigerant concentration is locally increased by the leaking refrigerant discharged from the casing of the heat medium relay unit.

The present invention has been made to solve at least one of the above-mentioned problems, and has an object to provide a heat pump apparatus capable of suppressing stagnation of leaking refrigerant inside a casing even when the refrigerant leaks, and suppressing the local increase in indoor refrigerant concentration.

Solution to Problem

According to one embodiment of the present invention, there is provided a heat pump apparatus, including: a refrigerant circuit including a compressor, a load-side heat exchanger, a pressure reducing device, and a heat source-side heat exchanger connected via a refrigerant pipe, the refrigerant circuit being configured to circulate refrigerant therethrough; and a load unit configured to accommodate at least the load-side heat exchanger therein, the load-side heat exchanger being configured to allow heat exchange between the refrigerant and a heat medium, the load unit comprising a heat medium circuit chamber configured to accommodate at least a part of a heat medium circuit configured to allow the heat medium to flow therethrough, a fan, an air inlet configured to suck indoor air therethrough, an air outlet formed at a different height position from a height position of the air inlet, and configured to blow indoors the air sucked through the air inlet, and an air passage formed between the air inlet and the air outlet, the air passage being isolated from the heat medium circuit chamber, the load-side heat exchanger being provided in the air passage.

Advantageous Effects of Invention

According to one embodiment of the present invention, even when the refrigerant leaks, the leaking refrigerant can be prevented from flowing from the air passage into the heat medium circuit chamber, and the leaking refrigerant can be quickly discharged from the casing through the air outlet. Therefore, the stagnation of the leaking refrigerant inside the casing can be suppressed. Further, a flow of air circulating at least in a vertical direction can be generated indoors where the leaking refrigerant is discharged. Therefore, the local increase in indoor refrigerant concentration can be suppressed.

DESCRIPTION OF EMBODIMENTS

Embodiment 1

Figure 1:
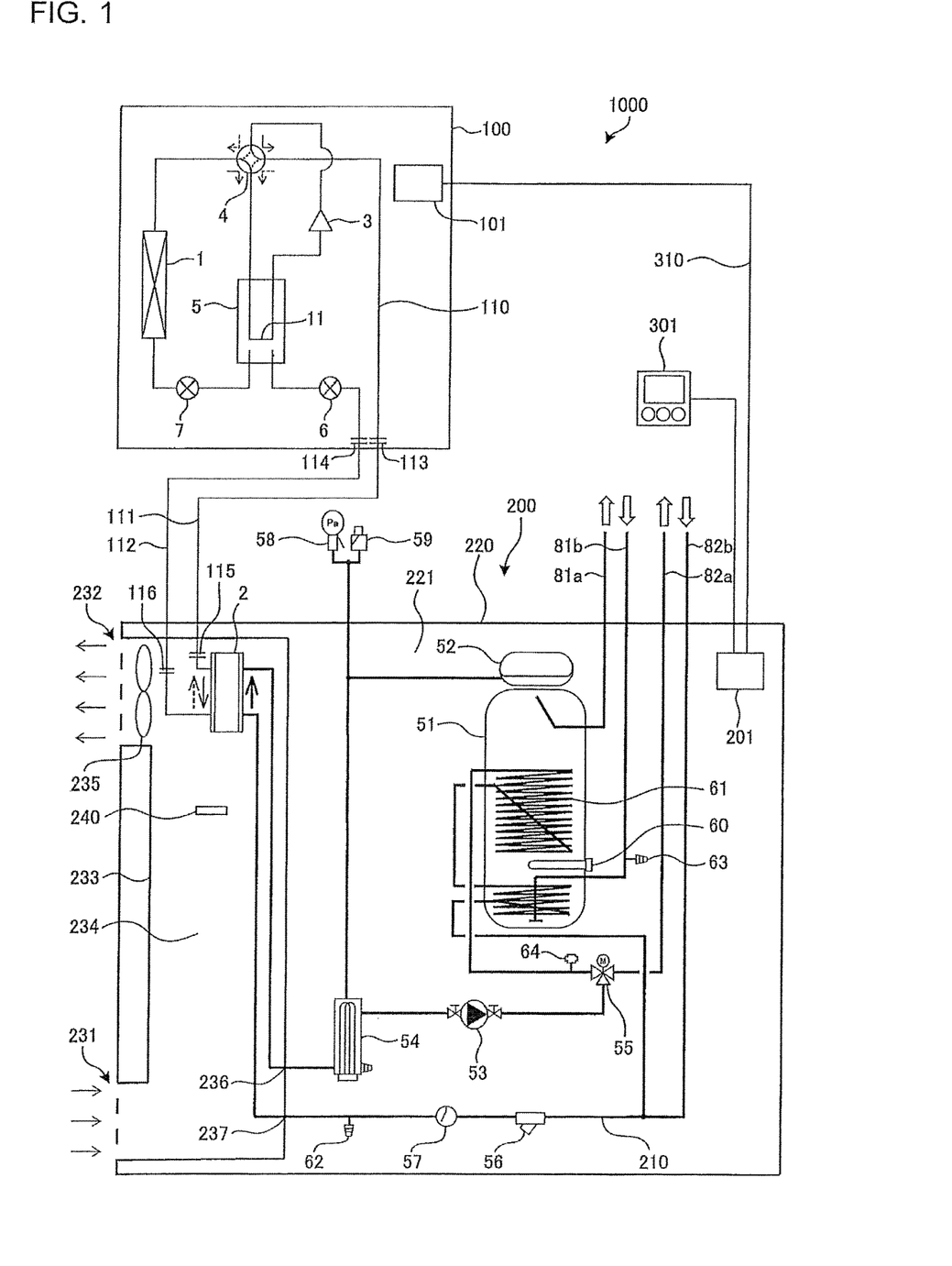
FIG. 1 is a view for illustrating a schematic configuration of a heat pump apparatus according to Embodiment 1 of the present invention.

A heat pump apparatus according to Embodiment 1 of the present invention is described. FIG. 1 is a view for illustrating a schematic configuration of the heat pump apparatus according to this embodiment. In this embodiment, a heat pump water heater 1000 is exemplified as the heat pump apparatus. In the following drawings including FIG. 1, a dimensional relationship between components, shapes of the components, and other matters may be different from those of actual components. A positional relationship (such as a vertical relationship) of the components described in the description is basically illustrated with the heat pump apparatus installed in an operable state.

As illustrated in FIG. 1, the heat pump water heater 1000 includes a refrigerant circuit 110 configured to circulate refrigerant therethrough to form a refrigeration cycle, and a water circuit 210 (one example of a heat medium circuit) configured to allow water (one example of a heat medium) to flow therethrough. First, the refrigerant circuit 110 is described. The refrigerant circuit 110 includes a compressor 3, a refrigerant flow switching device 4, a load-side heat exchanger 2 (indoor heat exchanger), a first pressure reducing device 6, an intermediate-pressure receiver 5, a second pressure reducing device 7, and a heat source-side heat exchanger 1 (outdoor heat exchanger), which are sequentially connected in an annular form via refrigerant pipes. The heat pump water heater 1000 can perform a normal operation (heating and hot water supply operation) for heating water flowing through the water circuit 210 and a defrosting operation for allowing the refrigerant to flow in a direction reverse to the normal operation to defrost the heat source-side heat exchanger 1.

Further, the heat pump water heater 1000 includes a load unit 200 (indoor unit) installed indoors and a heat source unit 100 (outdoor unit) installed, for example, outdoors, The load unit 200 is installed in, for example, a storage space such as a storage room inside a building in addition to a kitchen, a bathroom, and a laundry room, As the refrigerant to be circulated through the refrigerant circuit 110, flammable refrigerant is used. The flammable refrigerant includes slightly flammable refrigerant such as R32, HFO-1234yf, and HFO-1234ze, and highly flammable refrigerant such as R290 and R1270. The above-mentioned refrigerants may be used as single-component refrigerant or may be used as a refrigerant mixture containing two or more kinds of refrigerants.

The compressor 3 is a fluid machine configured to compress sucked low-pressure refrigerant and discharge the sucked low-pressure refrigerant as high-pressure refrigerant. The compressor 3 of this example includes an inverter device and other components, and is capable of varying a capacity (amount of refrigerant fed per unit time) by arbitrarily changing a drive frequency.

The refrigerant flow switching device 4 is configured to switch a direction of flow of the refrigerant in the refrigerant circuit 110 between the normal operation and the defrosting operation. As the refrigerant flow switching device 4, there is used, for example, a four-way valve.

The load-side heat exchanger 2 is a refrigerant-water heat exchanger configured to allow heat exchange between the refrigerant flowing through the refrigerant circuit 110 and the water flowing through the water circuit 210. As the load-side heat exchanger 2, there is used, for example, a plate type heat exchanger (brazed-plate type heat exchanger) having a configuration in which a plurality of members are joined together by brazing. The load-side heat exchanger 2 serves as a condenser (radiator) configured to heat water during the normal operation and serves as an evaporator (heat absorber) during the defrosting operation.

The first pressure reducing device 6 and the second pressure reducing device 7 are configured to regulate a flow rate of the refrigerant to regulate a pressure (reduce a pressure) of the refrigerant flowing into the load-side heat exchanger 2 or the heat source-side heat exchanger 1. The intermediate-pressure receiver 5 is positioned between the first pressure reducing device 6 and the second pressure reducing device 7 in the refrigerant circuit 110 and is configured to store surplus refrigerant. Inside the intermediate-pressure receiver 5, a suction pipe 11 connected to a suction side of the compressor 3 passes. In the intermediate-pressure receiver 5, heat is exchanged between refrigerant flowing through the suction pipe 11 and refrigerant inside the intermediate-pressure receiver 5. Therefore, the intermediate-pressure receiver 5 serves as an internal heat exchanger in the refrigerant circuit 110. As the first pressure reducing device 6 and the second pressure reducing device 7, there may be used, for example, electronic expansion valves capable of changing an opening degree through control executed by a controller 101 described later.

The heat source-side heat exchanger 1 is a refrigerant-air heat exchanger configured to allow heat exchange between the refrigerant flowing through the refrigerant circuit 110 and air (outdoor air) conveyed by an outdoor fan (not shown). The heat source-side heat exchanger 1 serves as an evaporator (heat absorber) during the normal operation and serves as a condenser (radiator) during the defrosting operation.

The compressor 3, the refrigerant flow switching device 4, the first pressure reducing device 6, the intermediate-pressure receiver 5, the second pressure reducing device 7, and the heat source-side heat exchanger 1 are accommodated in the heat source unit 100. The load-side heat exchanger 2 is accommodated in the load unit 200. The heat source unit 100 and the load unit 200 are connected to each other by, for example, two extension pipes 111 and 112 being a part of the refrigerant pipes. The extension pipes 111 and 112 are connected to the refrigerant pipes inside the heat source unit 100 via joint portions 113 and 114 (for example, flare joints), respectively. The extension pipes 111 and 112 are connected to the refrigerant pipes inside the load unit 200 (for example, refrigerant pipes coupled to the load-side heat exchanger 2 by brazing) via joint portions 115 and 116 (for example, flare joints), respectively.

Further, the heat source unit 100 includes the controller 101 configured to mainly control operations of the refrigerant circuit 110 (for example, the compressor 3, the refrigerant flow switching device 4, the first pressure reducing device 6, the second pressure reducing device 7, the outdoor fan (not shown), and other components). The controller 101 includes a microcomputer including a CPU, a ROM, a RAM, an I/O port, and other components. The controller 101 can perform mutual data communication with a controller 201 and an operating unit 301, which are described later, through a control line 310.

Next, an example of an operation of the refrigerant circuit 110 is described. In FIG. 1, a direction of flow of the refrigerant in the refrigerant circuit 110 during the normal operation is indicated by the arrowed solid lines. The refrigerant circuit 110 is configured so that, during the normal operation, refrigerant passages are switched by the refrigerant flow switching device 4 as indicated by the solid lines to allow high-temperature and high-pressure refrigerant to flow to the load-side heat exchanger 2.

High-temperature and high-pressure gas refrigerant discharged from the compressor 3 passes through the refrigerant flow switching device 4 and the extension pipe 111 to flow into a refrigerant passage of the load-side heat exchanger 2. During the normal operation, the load-side heat exchanger 2 serves as the condenser. Specifically, in the load-side heat exchanger 2, heat is exchanged between the refrigerant flowing through the refrigerant passage and water flowing through a water passage of the load-side heat exchanger 2 to cause transfer of condensation heat of the refrigerant to the water. As a result, the refrigerant flowing into the load-side heat exchanger 2 is condensed into high-pressure liquid refrigerant. Further, the water flowing through the water passage of the load-side heat exchanger 2 is heated by the heat transfer from the refrigerant.

The high-pressure liquid refrigerant condensed in the load-side heat exchanger 2 passes through the extension pipe 112 and flows into the first pressure reducing device 6 to be slightly reduced in pressure, thereby being transformed into two-phase refrigerant. The two-phase refrigerant flows into the intermediate-pressure receiver 5 to be cooled through heat exchange with low-pressure gas refrigerant flowing through the suction pipe 11, thereby being transformed into liquid refrigerant. The liquid refrigerant flows into the second pressure reducing device 7 to be reduced in pressure, thereby being transformed into low-pressure two-phase refrigerant. The low-pressure two-phase refrigerant flows into the heat source-side heat exchanger 1. During the normal operation, the heat source-side heat exchanger 1 serves as the evaporator. Specifically, in the heat source-side heat exchanger 1, heat is exchanged between the refrigerant flowing inside and the air (outdoor air) conveyed by the outdoor fan so that evaporation heat of the refrigerant is absorbed from the sent air. As a result, the refrigerant flowing into the heat source-side heat exchanger 1 is evaporated and transformed into low-pressure gas refrigerant. The low-pressure gas refrigerant passes through the refrigerant flow switching device 4 to flow into the suction pipe 11. The low-pressure gas refrigerant flowing into the suction pipe 11 is heated through the heat exchange with the refrigerant inside the intermediate-pressure receiver 5, and then sucked into the compressor 3. The refrigerant sucked into the compressor 3 is compressed and transformed into high-temperature and high-pressure gas refrigerant. During the normal operation, the above-mentioned cycle is repeated.

Next, an example of an operation during the defrosting operation is described. In FIG. 1, a direction of flow of the refrigerant in the refrigerant circuit 110 during the defrosting operation is indicated by the arrowed broken lines. The refrigerant circuit 110 is configured so that, during the defrosting operation, the refrigerant passages are switched by the refrigerant flow switching device 4 as indicated by the broken line to allow high-temperature and high-pressure refrigerant to flow into the heat source-side heat exchanger 1.

The high-temperature and high-pressure gas refrigerant discharged from the compressor 3 passes through the refrigerant flow switching device 4 to flow into the heat source-side heat exchanger 1. During the defrosting operation, the heat source-side heat exchanger 1 serves as the condenser. Specifically, in the heat source-side heat exchanger 1, heat is exchanged between the refrigerant flowing inside and frost adhering to a surface of the heat source-side heat exchanger 1. As a result, the frost adhering to the surface of the heat source-side heat exchanger 1 is heated by condensation heat of the refrigerant to be melted.

Next, the water circuit 210 is described. The water circuit 210 has a configuration in which a hot water tank 51 the load-side heat exchanger 2, a pump 53, a booster heater 54, a three-way valve 55, a strainer 56, a flow switch 57, a pressure relief valve 58, an air purge valve 59, and other components are connected by water pipes. In midway of the pipe that forms the water circuit 210, there is provided a drain outlet 62 configured to drain the water inside the water circuit 210.

The hot water tank 51 is a device configured to store water therein. The hot water tank 51 includes a coil 61 connected to the water circuit 210. The coil 61 is configured to allow heat exchange between water (heated water) circulating through the water circuit 210 and the water stored inside the hot water tank 51 to heat the water stored inside the hot water tank 51. Further, the hot water tank 51 includes an immersion heater 60. The immersion heater 60 is a heating unit configured to further heat the water stored inside the hot water tank 51.

The water inside the hot water tank 51 flows to a sanitary circuit-side pipe 81a (supply pipe) connected to, for example, a shower or other equipment. Further, a drain outlet 63 is also provided in the sanitary circuit-side pipe 81b (return pipe). Here, in order to prevent the water stored inside the hot water tank 51 from being cooled by outdoor air, the hot water tank 51 is covered with a heat insulating material (not shown). As the heat insulating material, for example, felt, Thinsulate (trademark), or a vacuum insulation panel (VIP), is used.

The pump 53 is a device configured to apply a pressure to the water inside the water circuit 210 to circulate the water inside the water circuit 210. The booster heater 54 is a device configured to further heat the water inside the water heater 210 when, for example, heating capacity of the heat source unit 100 is insufficient. The three-way valve 55 is a device configured to split the water inside the water circuit 210. For example, the three-way valve 55 is configured to switch flow of the water inside the water circuit 210 toward the hot water tank 51 or toward a heating circuit-side pipe 82a (supply pipe) to which an externally provided heating apparatus such as a radiator or floor heating is connected, Here, the heating circuit-side pipe 82a (supply pipe) and a heating circuit-side pipe 82b (return pipe) are pipes configured to circulate the water between the water circuit 210 and the heating apparatus. The strainer 56 is a device configured to remove scales (deposition) inside the water circuit 210. The flow switch 57 is a device configured to detect whether or not a flow rate of the water circulating inside the water circuit 210 is equal to or larger than a given rate.

An expansion tank 52 is a device configured to control a pressure varied depending on a change in volume of the water inside the water circuit 210 along with heating or other operations within a given range. The pressure relief valve 58 is a protection device. When the pressure in the water circuit 210 is increased to exceed the pressure control range of the expansion tank 52, the water inside the water circuit 210 is released to outside by the pressure relief valve 58. The air purge valve 59 is a device configured to release air generated in or mixed into the water circuit 210 to outside to prevent idling (air entrainment) of the pump 53. A manual air purge valve 64 is a manual valve configured to purge air in the water circuit 210. The manual air purge valve 64 is used in a case of purging the air mixed into the water circuit 210 at the time of, for example, water filling during installation work.

The water circuit 210 is accommodated inside a casing 220 of the load unit 200. At least a part of the water circuit 210 (for example, the hot water tank 51, the pump 53, the booster heater 54, the water pipes connected thereto, and other components) accommodated inside the casing 220 is arranged in a water circuit chamber 221 (one example of a heat medium circuit chamber) provided inside the casing 220. Meanwhile, at least the load-side heat exchanger 2 (for example, only the load-side heat exchanger 2 and the water pipes connected thereto) of the water circuit 210 is arranged in an air passage 234 described later. Specifically, the water circuit 210 is arranged across both the water circuit chamber 221 and the air passage 234 inside the casing 220.

The load unit 200 includes the controller 201 configured to control operations of the water circuit 210 (for example, the pump 53, the booster heater 54, and the three-way valve 55), a fan 235 described later, and other components. The controller 201 includes a microcomputer including a CPU, a ROM, a RAM, an I/O port, and other components. The controller 201 can perform mutual data communication with the controller 101 and the operating unit 301.

The operating unit 301 enables a user to operate the heat pump water heater 1000 and perform various settings. The operating unit 301 of this example includes a display unit, and can display various types of information such as a state of the heat pump water heater 1000. The operating unit 301 is provided on, for example, a front surface of the casing 220 of the load unit 200 at such a height that the user can perform a manual operation (for example, at about 1.0 m to about 1.5 m from a floor surface) (see FIG. 2).

Figure 2:
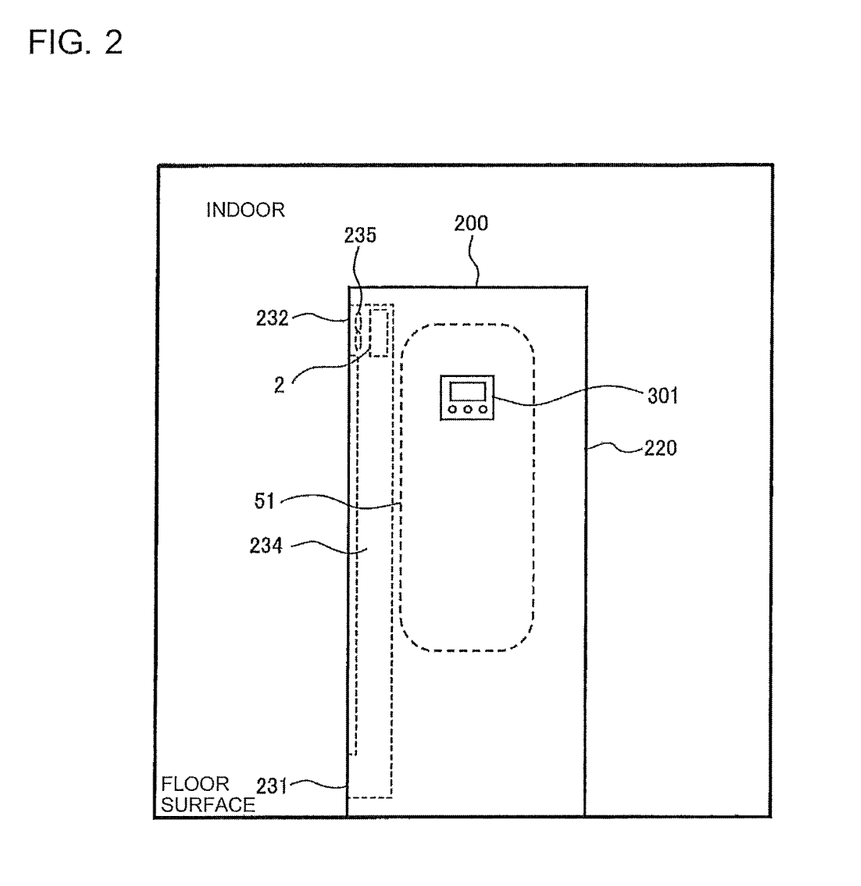
FIG. 2 is a front view for illustrating a configuration of a load unit 200 of the heat pump apparatus according to Embodiment 1 of the present invention.
Figure 3:
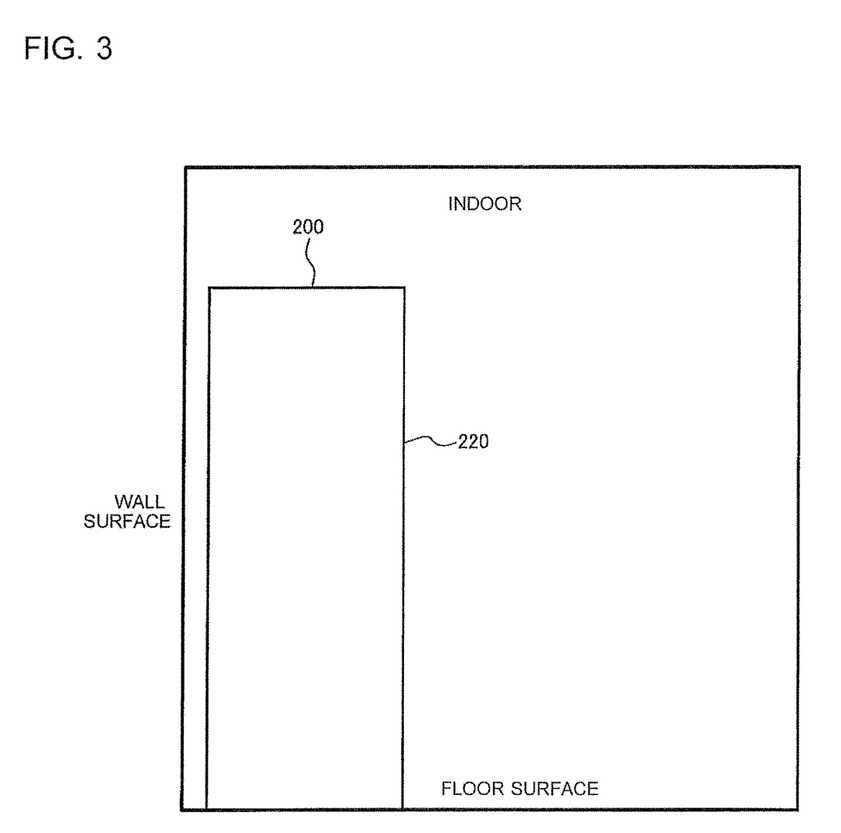
FIG. 3 is a side view for illustrating the configuration of the load unit 200 of the heat pump apparatus according to Embodiment 1 of the present invention.

Structural features of the load unit 200 are described with reference to FIG. 2 and FIG. 3 in addition to FIG. 1. FIG. 2 is a front view for illustrating a configuration of the load unit 200. FIG. 3 is a side view (left side view) for illustrating a configuration of the load unit 200. In FIG. 2 and FIG. 3, an example of an indoor installation state of the load unit 200 is also illustrated. As illustrated in FIG. 1 to FIG. 3, the load unit 200 of this example includes the hot water tank 51 and is of a floor-standing type to be installed on an indoor floor surface. The load unit 200 includes the casing 220 having a vertically elongated parallelepiped shape. The load unit 200 is installed, for example, so as to form a predetermined gap between a back surface of the casing 220 and an indoor wall surface. The casing 220 is made of, for example, metal.

In the casing 220, there are formed an air inlet 231 configured to suck indoor air and an air outlet 232 configured to blow the air sucked through the air inlet 231 indoors. The air inlet 231 is formed in a lower portion of a side surface (left side surface in this example) of the casing 220. The air inlet 231 of this example is formed at a position in the vicinity of the indoor floor surface, which is lower than the operating unit 301. The air outlet 232 is formed in an upper portion of the side surface (left side surface in this example) of the casing 220, specifically, at a position higher than the air inlet 231. The air outlet 232 of this example is formed at the position in the vicinity of a top surface of the casing 220, which is higher than the operating unit 301.

Here, the air inlet 231 may be formed in a front surface, a right side surface, or a back surface as long as the air inlet 231 is formed in the lower part of the casing 220. The air outlet 232 may be formed in the top surface, the front surface, the right side surface, or the back surface as long as the air outlet 232 is formed in the upper part of the casing 220.

Inside the casing 220, the air inlet 231 and the air outlet 232 are connected by a duct 233 extending in an approximately vertical direction. The duct 233 is made of, for example, metal. In a space inside the duct 233, there is formed an air passage 234 serving as a flow passage of the air between the air inlet 231 and the air outlet 232. The air passage 234 is isolated from the water circuit chamber 221 by the duct 233. The water circuit 210 is arranged at least partially in the water circuit chamber 221. In addition, the load-side heat exchanger 2 is arranged in the air passage 234. Thus, penetration portions 236 and 237 for allowing the water pipes of the water circuit 210 to pass therethrough are formed in the duct 233. As compared to the water circuit chamber 221, the air passage 234 accommodates a smaller number of components. Therefore, the air passage 234 can easily be simplified in shape and reduced in volume.

Inside the casing 220, the air passage 234 and the water circuit chamber 221 are isolated from each other by the duct 233, for example, in an airtight manner. As a result, flow of a gas between the air passage 234 and the water circuit chamber 221 is inhibited by the duct 233. Airtightness of the duct 233 is also ensured at the penetration portions 236 and 237. However, the air passage 234 is in communication with a space outside of the casing 220 through the air inlet 231 and the air outlet 232, and hence, the water circuit 221 is not necessarily sealed from the space outside of the casing 220.

Therefore, the air passage 234 and the water circuit chamber 221 are not necessarily isolated from each other in the airtight manner through the space outside of the casing 220.

In the air passage 234 of this example, there are arranged not only the load-side heat exchanger 2 but also the joint portions 115 and 116 connecting the load-side heat exchanger 2 and the extension pipes 111 and 112. In this example, most (for example, all) of the components of the refrigerant circuit 110 accommodated inside the load unit 200 are arranged in the air passage 234. As a result, the air passage 234 also serves as a refrigerant circuit chamber inside the casing 220 of the load unit 200. The load-side heat exchanger 2 and the joint portions 115 and 116 are arranged at an upper portion of the air passage 234 (for example, above an intermediate portion between an upper end and a lower end of the air passage 234 in this example, on a side closer to the air outlet 232 than the intermediate portion).

Further, the fan 235 configured to generate flow of air from the air inlet 231 to the air outlet 232 in the air passage 234 is provided in the air passage 234. As the fan 235, there is used a crossflow fan, a turbo fan, a sirocco fan, a propeller fan, or other fan. The fan 235 of this example is arranged, for example, so as to be opposed to the air outlet 232. An operation of the fan 235 is controlled by, for example, the controller 201.

A refrigerant detecting unit 240 configured to detect leakage of the refrigerant is provided below the load-side heat exchanger 2 inside the air passage 234. The refrigerant detecting unit 240 of this example is provided below the joint portions 115 and 116. The refrigerant detecting unit 240 is configured, for example, to detect a refrigerant concentration in air around the refrigerant detecting unit 240 and output a detection signal to the controller 201. In the controller 201, occurrence of the leakage of refrigerant is determined based on the detection signal from the refrigerant detecting unit 240. As the refrigerant detecting unit 240, there is used a gas sensor (such as a semiconductor gas sensor or a heat-wire type semiconductor gas sensor).

Figure 4:
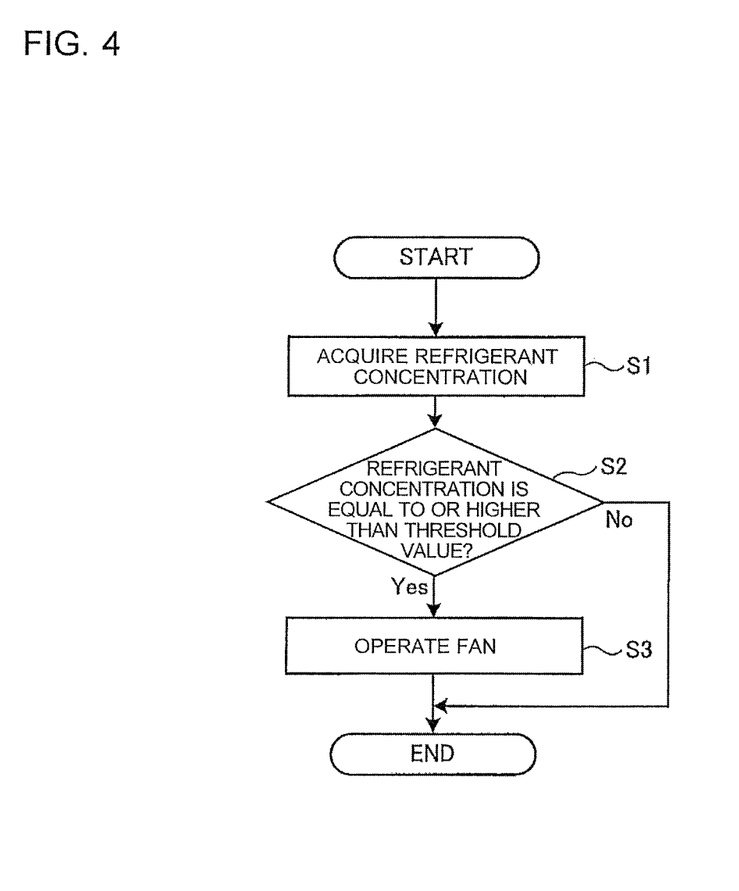
FIG. 4 is a flowchart for illustrating an example of refrigerant leakage detection processing executed by a controller 201 of the heat pump apparatus according to Embodiment 1 of the present invention.

FIG. 4 is a flowchart for illustrating an example of refrigerant leakage detection processing executed by the controller 201. The refrigerant leakage detection processing is repeatedly executed at predetermined time intervals all the time, for example, including the operating period and stopping period of the heat pump water heater 1000.

In Step S1 of FIG. 4, the controller 201 acquires information of the refrigerant concentration around the refrigerant detecting unit 240 based on the detection signal from the refrigerant detecting unit 240.

Next, in Step S2, determination is made on whether or not the refrigerant concentration around the refrigerant detecting unit 240 is equal to or larger than a preset threshold value. When it is determined that the refrigerant concentration is equal to or larger than the threshold value, the processing proceeds to Step S3. When it is determined that the refrigerant concentration is smaller than the threshold value, the processing is terminated.

In Step S3, an operation of the fan 235 is started. When the fan 235 is already in operation, the operation is continued. As a result, the flow of the air from the air inlet 231 toward the air outlet 232 is generated in the air passage 234. In Step S3, the display unit, an audio output unit, or other units, which are provided to the operating unit 301, may be used to notify the user of occurrence of the leakage of the refrigerant. The operation of the fan 235 is continued, for example, until elapsed time from a time at which the refrigerant concentration becomes lower than the threshold value after the start of the operation reaches preset time, or until a stop operation is performed by a service person through the operating unit 301 or other unit.

As described above, in this embodiment, the air passage 234 isolated from the water circuit chamber 221 is provided inside the casing 220 of the load unit 200, and at least the load-side heat exchanger 2 is arranged in the air passage 234. In the load unit 200, there is a high risk of occurrence of the leakage of the refrigerant in the load-side heat exchanger 2 having a large number of joint portions between the members by brazing or other method. Further, the fan 235 configured to generate the flow of air from the air inlet 231 toward the air outlet 232 is provided in the air passage 234. Further, the air passage 234 can easily be simplified in shape and reduced in volume as compared to the water circuit chamber 221. Therefore, formation of a recessed portion as a refrigerant stagnating portion inside the air passage 234 can be prevented. Further, the air in the air passage 234 can be quickly ventilated through the operation of the fan 235. Therefore, according to this embodiment, even when the leakage of the refrigerant occurs in the load-side heat exchanger 2, the leaking refrigerant can be prevented from flowing from the air passage 234 into the water circuit chamber 221, and the leaking refrigerant can be quickly discharged from the air outlet 232 out of the casing 220 (indoors). As a result, even when the leakage of the refrigerant occurs in the load unit 200, the stagnation of the leaking refrigerant inside the casing 220 can be suppressed.

Further, in this embodiment, the air inlet 231 and the air outlet 232 are formed at the height positions. Therefore, the flow of air circulating at least in the vertical direction (height direction) can be generated indoors where the leaking refrigerant is discharged. Therefore, according to this embodiment, the leaking refrigerant discharged from the air outlet 232 can be diffused indoors. Therefore, even when the leakage of the refrigerant occurs in the load unit 200, a local increase in indoor refrigerant concentration can be suppressed.

In particular, in this embodiment, the flammable refrigerant such as R32, HFO-1234yf, HFO-1234ze, R290, or R1270 is used as the refrigerant circulating through the refrigerant circuit 110. Therefore, when the indoor refrigerant concentration increases locally, there is a fear of formation of a flammable concentration region indoors.

Those flammable refrigerants have a density higher than air at an atmospheric pressure (for example, at a room temperature (25 degrees Celsius) as a temperature). Therefore, when the leakage of the refrigerant occurs at a relatively high position from the indoor floor surface, the leaking refrigerant is diffused while moving down, and hence the refrigerant concentration is equalized indoors. Therefore, the refrigerant concentration is less liable to increase. Meanwhile, when the leakage of the refrigerant occurs at a low position from the indoor floor surface, the leaking refrigerant stays at the low position near the floor surface. Therefore, the refrigerant concentration is liable to increase locally. As a result, the risk of formation of the flammable concentration region is relatively increased.

In this embodiment, the air outlet 232 is formed above the air inlet 231. Therefore, even when the leakage of the flammable refrigerant occurs in the load unit 200, the leaking refrigerant having a density higher than that of air under the atmospheric pressure is blown from the air outlet 232. As a result, the leaking refrigerant can be diffused throughout indoors while being moved down from an upper indoor position (for example, near a ceiling), Further, the air having a low refrigerant concentration at a lower indoor position (for example, near the floor surface) is sucked through the air inlet 231. As a result, the air having the low refrigerant concentration can be circulated indoors. Therefore, the formation of the flammable concentration region can be suppressed indoors where the leaking refrigerant is discharged from the casing 220.

Further, in this embodiment, the flow of the air circulating in the vertical direction can be generated indoors where the load unit 200 is installed. Therefore, the indoor air can be mixed vertically. Therefore, even when the leakage of the flammable refrigerant occurs in the load unit 200, air at a low height position at which the refrigerant concentration is liable to increase and air at a high height position at which the refrigerant concentration is less liable to increase can be easily mixed. Thus, according to this embodiment, the leaked flammable refrigerant can be prevented from staying near the floor surface. Thus, the formation of the flammable concentration region can be more reliably suppressed. In particular, in the case of the floor-standing type load unit 200, the position at which the leakage of the refrigerant to indoors tends to be a low position near the floor surface, and hence the leaking refrigerant is liable to stay at the low position in the vicinity of the floor surface. Therefore, particularly enhanced effects can be obtained.

Still further, in this embodiment, not only the load-side heat exchanger 2 but also the joint portions 115 and 116 having a high risk of occurrence of the leakage of the refrigerant as in the case of the load-side heat exchanger 2 are arranged in the air passage 234. Therefore, according to this embodiment, even when the leakage of the refrigerant occurs in the joint portions 115 and 116, the stagnation of the leaking refrigerant inside the casing 220 can be suppressed.

Still further, in this embodiment, the refrigerant having a density higher than that of the air under the atmospheric pressure is used. Therefore, when the leakage of the refrigerant occurs in the load-side heat exchanger 2, an approximately whole amount of the leaking refrigerant flows down inside the air passage 234 flowing roundabout to an other path inside the casing 220. Meanwhile, in this embodiment, the refrigerant detecting unit 240 is provided below the load-side heat exchanger 2 in the air passage 234. Therefore, the refrigerant concentration around the refrigerant detecting unit 240 can be quickly increased. Thus, the leakage of the refrigerant can be more quickly and more reliably detected. As a result, measures such as activation of the fan 235 or notification of the leakage of the refrigerant to the user can be more quickly and more reliably taken.

Still further, in this embodiment, even when the leakage of the refrigerant occurs in any of the load-side heat exchanger 2 and the joint portions 115 and 116, the approximately whole amount of the leaking refrigerant flows down inside the air passage 234. Therefore, as long as the single-component refrigerant detecting unit 240 is provided in the air passage 234, the leakage of the refrigerant can be more quickly and more reliably detected without providing the refrigerant detecting unit 240 at each of a plurality of positions having a risk of the refrigerant leakage. Therefore, the number of refrigerant detecting units 240 can be reduced, and hence manufacturing cost for the heat pump water heater 1000 can be reduced.

Still further, in this embodiment, the fan 235 is operated only when the leakage of the refrigerant is detected. Therefore, as compared to a configuration of operating the fan 235 all the time, operating cost (for example, electricity cost) of the fan 235 can be reduced.

Figure 5:
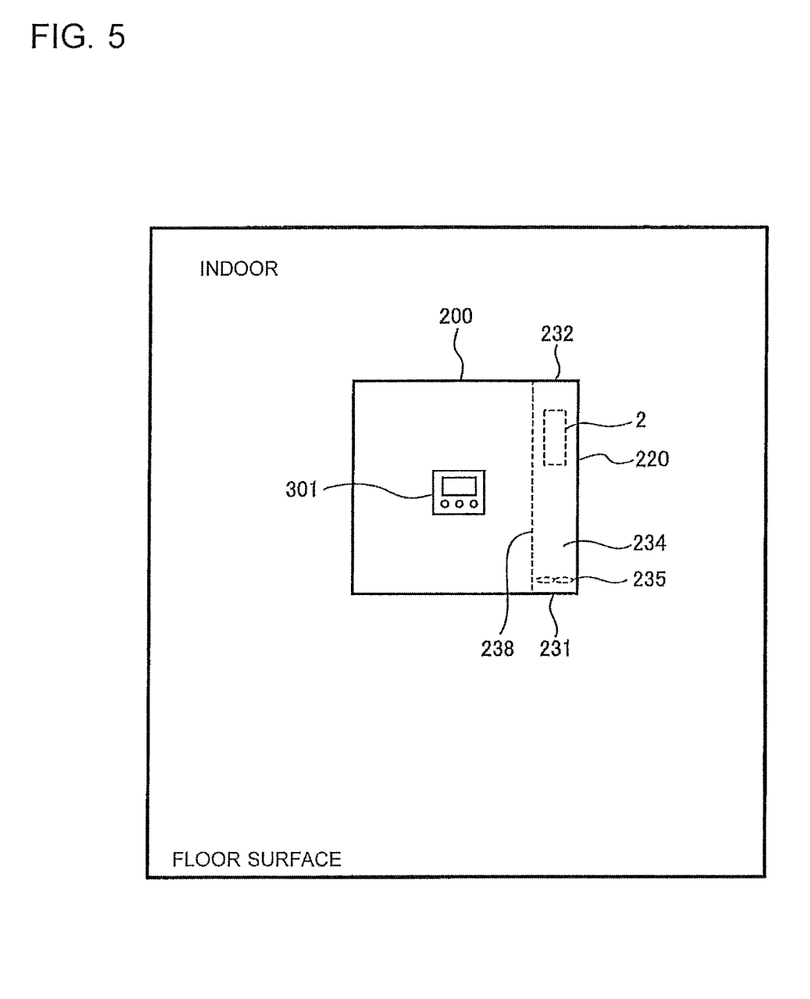
FIG. 5 is a front view for illustrating a configuration of the load unit 200 according to a modified example of Embodiment 1 of the present invention.
Figure 6:
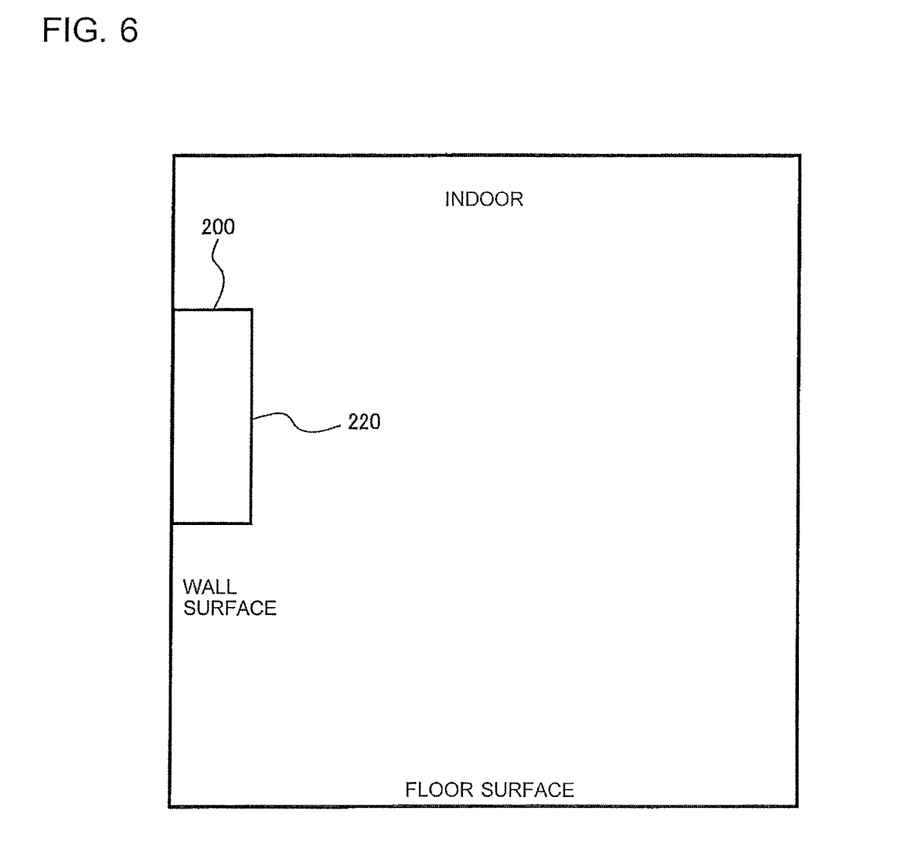
FIG. 6 is a side view for illustrating the configuration of the load unit 200 according to the modified example of Embodiment 1 of the present invention.
Figure 7:
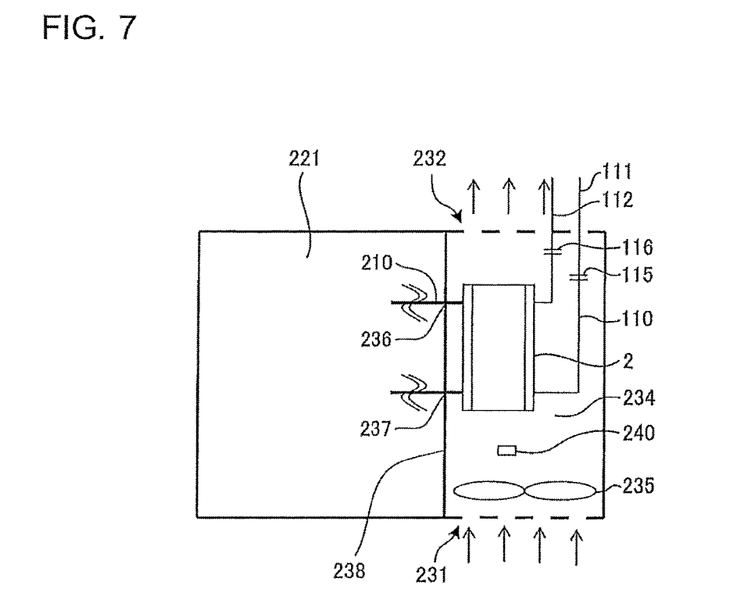
FIG. 7 is a front view for illustrating an internal configuration of the load unit 200 according to the modified example of Embodiment 1 of the present invention.

FIG. 5 is a front view for illustrating a configuration of the load unit 200 according to a modified example of this embodiment. FIG. 6 is a side view (left side view) for illustrating the configuration of the load unit 200. FIG. 7 is a front view for illustrating an internal configuration of the load unit 200. As illustrated in FIG. 5 to FIG. 7, the load unit 200 of this modified example is of a wall-mounted type without including a hot water tank inside. The load unit 200 is fixed to an indoor wall surface and is installed at a position higher than the indoor floor surface. The casing 220 of the load unit 200 is made of, for example, metal. A hot water tank is separated from the load unit 200 and is installed at a location different from the load unit 200.

The operating unit 301 is provided on a front surface of the casing 220. The load unit 200 is installed on the wall surface so that the operating unit 301 is arranged at such a height that the user can perform operation by hand (for example, at about 1.0 m to 1.5 m from the floor surface).

Inside the casing 220, there are formed the air passage 234 serving as a flow passage of the air between the air inlet 231 and the air outlet 232, and the water circuit chamber 221 in which the water circuit 210 is at least partially arranged. The air inlet 231 is formed in a bottom surface of the casing 220. The air outlet 232 is formed in the top surface of the casing 220 so as to be located above the air inlet 231. The air passage 234 and the water circuit chamber 221 are isolated from each other by a partition plate 238 arranged along a vertical direction. The partition plate 238 is made of, for example, metal.

In the air passage 234, there are arranged the load-side heat exchanger 2 and the joint portions 115 and 116. Further, the fan 235 and the refrigerant detecting unit 240 are arranged in the air passage 234. The refrigerant detecting unit 240 is arranged below the load-side heat exchanger 2 and the joint portions 115 and 116. The penetration portions 236 and 237 allowing the water pipes of the water circuit 210 to pass therethrough are formed in the partition plate 238.

The load unit 200 of this modified example is of the wall-mounted type. However, the operating unit 301 is arranged at such a height that the user can perform operation by hand. Therefore, as compared to a wall-mounted type indoor unit for an air conditioning apparatus, the load unit 200 is installed at a lower position. Therefore, in the case of the wall-mounted type load unit 200 described above, a position at which the leakage of the refrigerant occurs is liable to be a close position near the floor surface, and hence the leaking refrigerant is liable to stay at the low position near the floor surface. Thus, as in the case of the floor-standing type load unit 200, enhanced effects are obtained.

As described above, the heat pump apparatus according to the embodiment described above includes the refrigerant circuit 110 including the compressor 3, the load-side heat exchanger 2, the pressure reducing device (the first pressure reducing device 6 and the second pressure reducing device 7 in this example), and the heat source-side heat exchanger 1 connected via the refrigerant pipes, and being configured to circulate the refrigerant therethrough, and the load unit 200 arranged indoors and configured to accommodate at least the load-side heat exchanger 2 therein. The load-side heat exchanger 2 is configured to allow the heat exchange between the refrigerant and the heat medium (water in this example). The load unit 200 includes a heat medium circuit chamber (the water circuit chamber 221 in this example) configured to accommodate at least a part of the heat medium circuit (the water circuit 210 in this example) configured to allow the heat medium to flow therethrough, the fan 235, the air inlet 231 configured to suck the indoor air therethrough, the air outlet 232 formed at a height position different from a height position of the air inlet 231, and configured to blow indoors the air sucked through the air inlet 231, and the air passage 234 formed between the air inlet 231 and the air outlet 232 so as to be isolated from the heat medium circuit chamber. The load-side heat exchanger 2 is provided in the air passage 234.

Further, the heat pump apparatus according to the embodiment described above may further include the heat source unit 100 configured to accommodate at least the compressor 3 and the heat source-side heat exchanger 1, and connected to the load unit 200 via the extension pipes 111 and 112 being a part of the refrigerant pipes, in which the load-side heat exchanger 2 and the extension pipes 111 and 112 may be connected to each other via the joint portions 115 and 116, and the joint portions 115 and 116 may be provided in the air passage 234.

Still further, in the heat pump apparatus according to the embodiment described above, the refrigerant may have a density higher than air under the atmospheric pressure, and the load unit 200 may include the refrigerant detecting unit 240 provided below the load-side heat exchanger 2 in the air passage 234.

Still further, the heat pump apparatus according to the embodiment described above may further include a controller (the controller 201 in this example) configured to control the fan 235 based on the detection signal from the refrigerant detecting unit 240. The controller may be configured to operate the fan 235 when detecting the leakage of the refrigerant.

Still further, in the heat pump apparatus according to the embodiment described above, the load unit 200 may be of the floor-standing type to be installed on the indoor floor surface. One of the air inlet 231 and the air outlet 232 may be formed in the upper portion of the front surface, the upper portion of the side surface, the upper portion of the back surface, or the top surface of the casing 220 of the load unit 200, whereas an other of the air inlet 231 and the air outlet 232 may be formed in the lower portion of the front surface, the lower portion of the side surface, or the lower portion of the back surface of the casing 220.

Still further, in the heat pump apparatus according to the embodiment described above, the load unit 200 may be of the wall-mounted type to be installed at the position higher than the indoor floor surface. One of the air inlet 231 and the air outlet 232 may be formed in the upper portion of the front surface, the upper portion of the side surface, or the top surface of the casing 220 of the load unit 200, whereas an other of the air inlet 231 and the air outlet 232 may be formed in the lower portion of the front surface, the lower portion of the side surface, or the bottom surface of the casing 220.

Still further, in the heat pump apparatus according to the embodiment described above, the refrigerant may have a density higher than air under the atmospheric pressure, and the air outlet 232 may be formed above the air inlet 231.

Still further, in the heat pump apparatus according to the embodiment described above, the refrigerant may be flammable refrigerant.

Other Embodiments

The present invention can be modified in various ways without being limited to the embodiment described above.

For example, although the heat pump water heater 1000 is described as an example of the heat pump apparatus in the above-mentioned embodiment, the present invention is also applicable to other heat pump apparatus.

Further, in the embodiment described above, the water is described as an example of the heat medium. However, other liquid heat media such as brine, or other fluid (including a gaseous fluid and a fluid in a supercritical state) can be used as the heat medium.

Further, in the embodiment described above, there is described, as an example, the configuration in which the load-side heat exchanger 2 and the joint portions 115 and 116 are all arranged in the air passage 234. However, the joint portions 115 and 116 may be arranged outside of the air passage 234 (for example, outside of the casing 220) as long as at least the load-side heat exchanger 2 is arranged in the air passage 234. In this case, for example, when refrigerant having a density higher than the air is used, it is preferred that the joint portions 115 and 116 be provided at high positions (for example, above the air outlet 232, above the top surface of the casing 220, or other positions), In this manner, even when the leakage of the refrigerant occurs at the joint portions 115 and 116, the leaking refrigerant is diffused throughout indoors while moving down from an upper indoor side. Therefore, the local increase in refrigerant concentration can be prevented.

Still further, in the embodiment described above, there is described, as an example, the configuration in which the fan 235 is operated only when the leakage of the refrigerant is detected. However, the fan 235 may be operated all the time including the operating period and stopping period of the heat pump water heater 1000. Still further, the fan 235 may be intermittently operated, for example, at given cycles all the time including the operating period and stopping period of the heat pump water heater 1000. In the above-mentioned cases, the installation of the refrigerant detecting unit 240 can be omitted. Therefore, the manufacturing cost for the heat pump water heater 1000 can be reduced.

Still further, in the embodiment described above, there is described, as an example, the configuration in which the air inlet 231 is formed in the lower portion of the casing 220 and in which the air outlet 232 is formed above the air inlet 231. However, the vertical positional relationship of the air inlet 231 and the air outlet 232 may be inverted. Specifically, the air outlet 232 may be formed in the lower portion of the casing 220, and the air inlet 231 may be formed above the air outlet 232.

Still further, in the embodiment described above, there is described, as an example, the refrigerant having the density higher than that of the air under the atmospheric pressure. However, refrigerant having a density lower than that of the air under the atmospheric pressure can also be used.

Still further, in the embodiment described above, the flammable refrigerant is described as an example in the above-mentioned embodiment, refrigerant without flammability (for example, nonflammable (1 under ASHRAE 34 classification) refrigerant) can also be used.

Still further, each of the embodiments and the modified example described above can be carried out in combination.

REFERENCE SIGNS LIST 1 heat source-side heat exchanger 2 load-side heat exchanger 3 compressor 4 refrigerant flow switching device 5 intermediate-pressure receiver 6 first pressure reducing device 7 second pressure reducing device 11 suction pipe 51 hot water tank 52 expansion tank 53 pump 54 booster heater 55 three-way valve 56 strainer 57 flow switch 58 pressure relief valve 59 air purge valve 60 immersion heater 61 coil 62, 63 drain outlet 64 manual air purge valve 81a, 81b sanitary circuit-side pipe 82a, 82b heating circuit-side pipe 100 heat source unit 101, 201 controller 110 refrigerant circuit 111, 112 extension pipe 113, 114, 115, 116 joint portion 200 load unit 210 water circuit 220 casing 221 water circuit chamber 231 air inlet 232 air outlet 233 duct 234 air passage 235 fan 236, 237 penetration portion 238 partition plate 240 refrigeration detecting unit 301 operating unit 310 control line 1000 heat pump water heater

The invention claimed is:

1. A heat pump apparatus, comprising:
   a refrigerant circuit including a compressor, a load-side heat exchanger, a pressure reducing device, and a heat source-side heat exchanger connected via a refrigerant pipe, the refrigerant circuit being configured to circulate refrigerant therethrough; and
   a load unit configured to accommodate at least the load-side heat exchanger therein,
   the load-side heat exchanger being configured to allow heat exchange between the refrigerant and a heat medium,
   the load unit comprising
      a heat medium circuit chamber configured to accommodate at least a part of a heat medium circuit configured to allow the heat medium to flow therethrough,
      a fan,
      an air inlet configured to suck indoor air therethrough,
      an air outlet formed at a different height position from a height position of the air inlet, and configured to blow indoors the air sucked through the air inlet, and
      an air passage formed between the air inlet and the air outlet, the air passage being isolated from the heat medium circuit chamber,
      the load-side heat exchanger being provided in the air passage.

2. The heat pump apparatus of claim 1, further comprising a heat source unit configured to accommodate at least the compressor and the heat source-side heat exchanger therein, the heat source unit being connected to the load unit via an extension pipe, the extension pipe being a part of the refrigerant pipe, wherein
   the load-side heat exchanger and the extension pipe are connected via a joint portion, and
   the joint portion is provided in the air passage.

3. The heat pump apparatus of claim 1, wherein
   the heat pump apparatus utilizes a refrigerant having a density higher than air under an atmospheric pressure, and
   the load unit comprises a refrigerant detecting sensor provided below the load-side heat exchanger in the air passage.

4. The heat pump apparatus of claim 3, further comprising a controller configured to control the fan based on a detection signal from the refrigerant detecting sensor, wherein
   the controller is configured to operate the fan when detecting leakage of the refrigerant.

5. The heat pump apparatus of claim 1, wherein
   the load unit is of a floor-standing type to be installed on a floor surface, and
   one of the air inlet and the air outlet is formed in an upper portion of a front surface, an upper portion of a side surface, an upper portion of a back surface, or a top surface of a casing of the load unit, whereas another of the air inlet and the air outlet is formed in a lower portion of the front surface, a lower portion of the side surface, or a lower portion of the back surface of the casing.

6. The heat pump apparatus of claim 1, wherein
   the load unit is of a wall-mounted type to be installed at a position higher than a floor surface, and
   one of the air inlet and the air outlet is formed in an upper portion of a front surface, an upper portion of a side surface, or a top surface of a casing of the load unit, whereas another of the air inlet and the air outlet is formed in a lower portion of the front surface, a lower portion of the side surface, or a bottom surface of the casing.

7. The heat pump apparatus of claim 1, wherein
   the heat pump apparatus utilizes a refrigerant having a density higher than air under an atmospheric pressure, and
   the air outlet is formed above the air inlet.

8. The heat pump apparatus of claim 1, wherein the heat pump apparatus utilizes a flammable refrigerant.

9. A heat pump apparatus, comprising:
   a housing installed within refrigerant circuit including a compressor, a load-side heat exchanger, a pressure reducing device, and a heat source-side heat exchanger connected via a refrigerant pipe, the refrigerant circuit being configured to circulate refrigerant therethrough; and
   a load unit configured to accommodate at least the load-side heat exchanger therein,
   the load-side heat exchanger being configured to allow heat exchange between the refrigerant and a heat medium,
   the load unit comprising a casing enclosing
      a heat medium circuit chamber configured to accommodate at least a part of a heat medium circuit configured to allow the heat medium to flow therethrough,
      a fan,
      an air inlet configured to suck indoor air through the casing of the load unit,
      an air outlet formed at a different height position from a height position of the air inlet, and configured to blow indoors the air sucked through the air inlet, and
      an air passage formed between the air inlet and the air outlet within heat medium circuit chamber, the air passage being isolated from the heat medium circuit chamber,
      the load-side heat exchanger being provided in the air passage.

10. The heat pump apparatus of claim 9, further comprising a heat source unit configured to accommodate at least the compressor and the heat source-side heat exchanger therein, the heat source unit being connected to the load unit via an extension pipe, the extension pipe being a part of the refrigerant pipe, wherein
    the load-side heat exchanger and the extension pipe are connected via a joint portion, and
    the joint portion is provided in the air passage.

11. The heat pump apparatus of claim 9, wherein
    the heat pump apparatus utilizes a refrigerant having a density higher than air under an atmospheric pressure, and
    the load unit comprises a refrigerant detecting sensor provided below the load-side heat exchanger in the air passage.

12. The heat pump apparatus of claim 11, further comprising a controller configured to control the fan based on a detection signal from the refrigerant detecting sensor, wherein the controller is configured to operate the fan when detecting leakage of the refrigerant.

13. The heat pump apparatus of claim 9, wherein the load unit is of a floor-standing type to be installed on a floor surface, and one of the air inlet and the air outlet is formed in an upper portion of a front surface, an upper portion of a side surface, an upper portion of a back surface, or a top surface of a casing of the load unit, whereas another of the air inlet and the air outlet is formed in a lower portion of the front surface, a lower portion of the side surface, or a lower portion of the back surface of the casing.

14. The heat pump apparatus of claim 9, wherein the load unit is of a wall-mounted type to be installed at a position higher than a floor surface, and one of the air inlet and the air outlet is formed in an upper portion of a front surface, an upper portion of a side surface, or a top surface of a casing of the load unit, whereas another of the air inlet and the air outlet is formed in a lower portion of the front surface, a lower portion of the side surface, or a bottom surface of the casing.

15. The heat pump apparatus of claim 9, wherein the heat pump apparatus utilizes a refrigerant having a density higher than air under an atmospheric pressure, and the air outlet is formed above the air inlet.

16. The heat pump apparatus of claim 9, wherein the heat pump apparatus utilizes a flammable refrigerant.

* * * * *